Nov. 21, 1967 W. G. LAMBERT 3,353,619
AUTOMOTIVE SPEED ZONE CONTROL SYSTEM
Filed June 27, 1966

INVENTOR
WARREN G. LAMBERT
BY
J. Robert Henderson
ATTORNEY

United States Patent Office 3,353,619
Patented Nov. 21, 1967

3,353,619
AUTOMOTIVE SPEED ZONE CONTROL SYSTEM
Warren G. Lambert, 525 Aspen St.,
Morgantown, W. Va. 26505
Filed June 27, 1966, Ser. No. 560,605
3 Claims. (Cl. 180—98)

This application constitutes a continuation-in-part of my co-pending application Ser. No. 437,735, filed Mar. 8, 1965.

This invention relates to a vehicle in general, and in particular to system or device for controlling the speed of the vehicle.

Our street and highway systems require constant alertness by the drivers of vehicles which traverse them. Dangerous crossings, school zones, and many other potentially dangerous situations necessitate a maximum prescribed rate of speed for the protection of the driver and occupants of the vehicle, as well as for the pedestrians and children in the vicinity of the right of way, who have occasion to cross or enter upon the street.

Speed zone signs are used to assist the driver and to protect society, but overconfidence, driver fatigue, destruction or obstruction of the sign, and detractions are factors which deter compliance therewith.

The object of this invention is to provide a zone speed control device, for mounting on a vehicle, that will cause the vehicle to comply with the particular speed restrictions as it enters a speed zone.

To provide the capability of obtaining this objective without changing or modifying the present type of highway and street structure is another object of this invention. By the utilization of stripes painted on the surface of the road or by inlaying slabs in the surface, having a different reflective quality than the normal surface, every speed zone area can control the speed of a vehicle passing therethrough that has this invention mounted on it.

It is another object of this invention to provide a device attachable to a vehicle which can photoelectrically differentiate between the texture of the road surface and a stripe marking surface, and which translates the difference into a signal useable to control the air-fuel ratio intake of the engine. By this system, therefore, as the car enters a surface prepared speed zone, the speed of the car will automatically be controlled, wherein the velocity thereof will not exceed the maximum prescribed for that particular zone.

Still another object of this invention is to provide a device as set forth hereinbefore capable of reducing aggressive driving due to a lack of response of the accelerator; which should eliminate passing and head-on collisions, forcing the automobiles to stay within the speed limit, and furthermore providing a better spacing of cars going in the same direction, obviating thereby rear-end collisions.

Another object of this invention is to actually enable an increased average rate of speed with increased safety because of better control, decreasing the cost of car operation, and original cost by decreasing the need for a large horsepower rating, and thus lowering insurance rates, reducing deaths and injuries and furthermore reducing highway police problems and personnel.

Yet another object of this invention is to provide a device capable of attaining the above designated objectives which is economical to manufacture, easily installed and effective in operation.

These objects, and other features and advantages of this invention will be readily apparent upon reference to the following description, when taken in conjunction with the accompanying drawings, wherein.

Figure 1:
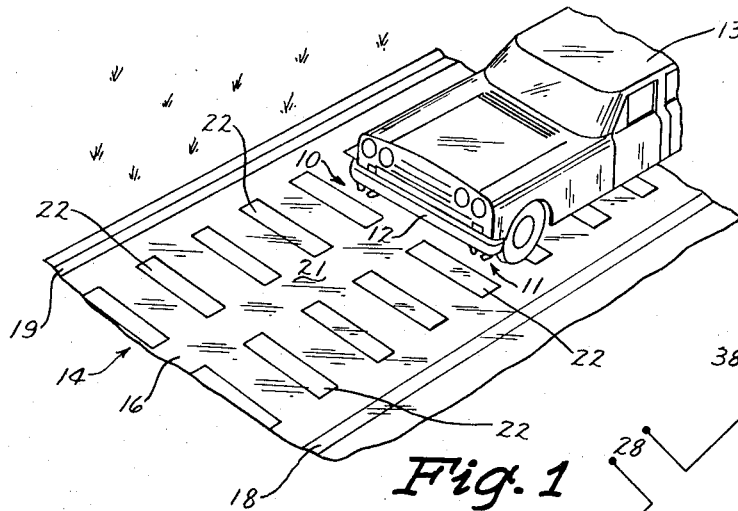
FIG. 1 is a fragmentary, pictorial representation of a roadway and vehicle to which the invention is attached.

Referring now to the drawings, a pair of lane alignment warning apparatus are indicated generally at 10 and 11 in FIG. 1, mounted on each end of the front bumper 12 of a vehicle 13.

Figure 2:
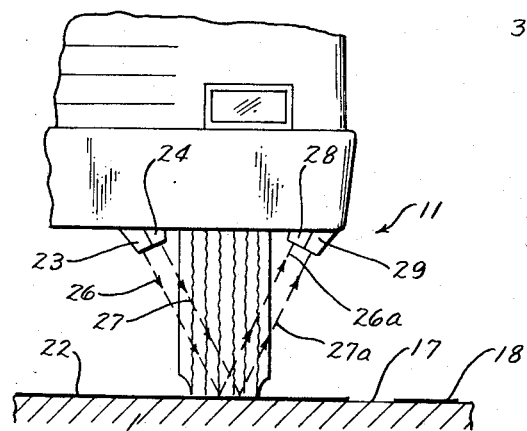
FIG. 2 is a fragmentary, front elevational view of one end of the front bumper of the vehicle of FIG. 1.

The vehicle 13 (FIG. 1) is shown traveling over a road indicated generally at 14, and comprised of concrete 16 (FIG. 2) having a surface 17 of certain texture. A center stripe 18 (FIGS. 1 and 2) of fluorescent paint is placed down the center of the road 14, and another like stripe 19 is placed along each side edge of the road 14 to define a safe driving lane 21. A plurality of spaced stripes 22, of fluorescent paint, are placed in the lane 21 in two parallel rows, wherein the longitudinal axis of each stripe 22 is transversely disposed relative to the longitudinal axis of the lane 21. The texture of the surface of the stripes 18, 19 and 22 are different from that of the concrete surface 17.

As each apparatus 10 and 11 is identical, only one will be described, apparatus 11 for example.

A pair of light sources 23 and 24 (FIG. 2) are mounted in laterally spaced and laterally aligned relation on the bumper 12. The sources 23 and 24 of light are conventional in that each directs a ray, the rays indicated at 26 and 27 (FIG. 2), toward the road 14.

The rays 26 and 27 are parallel and are directed angularly toward the road 14. Thus upon striking the road surface, the light rays are reflected upwardly at the same angle and in parallel. To intercept and receive the reflected rays 26a and 27a, a pair of photoelectric cell units 28 and 29 are provided. The cell units are mounted in laterally spaced and aligned relation on the bumper 12, being spaced laterally outwardly of the light sources 23 and 24. By this arrangement, unit 28 receives reflected light ray 26a and unit 29 receives reflected ray 27a.

Figure 3:
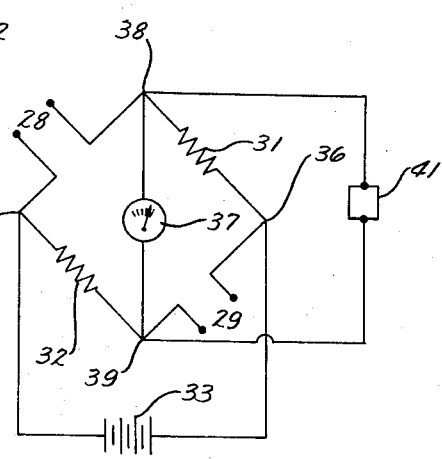
FIG. 3 is a schematic of the electric circuit used in the lane alignment system.

Referring to FIG. 3, the photoelectric cell units 28 and 29 are placed in a Wheatstone bridge circuit as illustrated. The units are interposed in opposite legs of the bridge, with a pair of resistances 31 and 32 of equal rating inserted in the other two legs. A source of electric energy, such as the battery 33 of the vehicle 13, is connected across the bridge at 34 and 36 and an ohmmeter 37 is connected across the bridge at 38 and 39 to indicate an unbalance, if any, in the bridge.

Thus, the bridge is a means of measuring and indicating whether the intensities of light received by the photoelectric cells 28 and 29 are equal or whether they are different. Should they be equal, as where they are both reflected off a surface having an unchanged texture, their electrical output will be the same and no net electrical signal will result. Conversely, should the intensity of the reflected light rays 26a and 27a as received by the cell units 28 and 29 be different, a net electrical output from the cell units will result, the bridge will be unbalanced, and a net output signal will occur.

By connecting a signal device 41 across the bridge at 37 and 38, such as a bell, light or the like, operable in response to the occurrence of the output signal, the fact that an unbalance occurred across the bridge can be indicated by sound or visibility to the operator of the vehicle. Thus, he would be warned that the vehicle 13 has drifted either over the center stripe 18 or over the side stripe 19.

Referring back to FIGS. 1 and 2, it will be noted that reflected light ray 27a and its photoelectric receiver 29 are spaced laterally outwardly of the reflected ray 26a and its receiver 28. Putting it another way, the former "pair" are closer to the center stripe 18 than are the latter "pair." Therefore, should the vehicle 13 stray toward the center stripe 18, the reflected ray 27a will "detect" the existence of the different surface texture of the painted stripe 18, while the reflected ray 26a is still reflecting an intensity of light determined by the surface texture of the concrete 16.

This will, as explained hereinbefore, result in an output signal indication by the signal device 41 thus warning the driver. As soon as the vehicle is directed back into the lane 21, both light rays 26 and 27 will detect the same texture of the concrete 16, no net output signal will be had, the energization for the signal device 41 will be eliminated, and indication by the device 41 will stop, indicating—in effect—that the vehicle is again proceeding properly in the lane 21.

The speed zone control device utilizes part of the lane alignment warning apparatus 10 and 11 in that only one light source 23 (FIG. 2) and only one photoelectric cell unit 28 from each apparatus 10 and 11 are required. Although source 23 and unit 28 are designated above, source 24 and unit 29 would work equally as well. As each pair of elements from apparatus 10 or 11 are identical only one will be described, source 23 and unit 28 for example.

Figure 4:
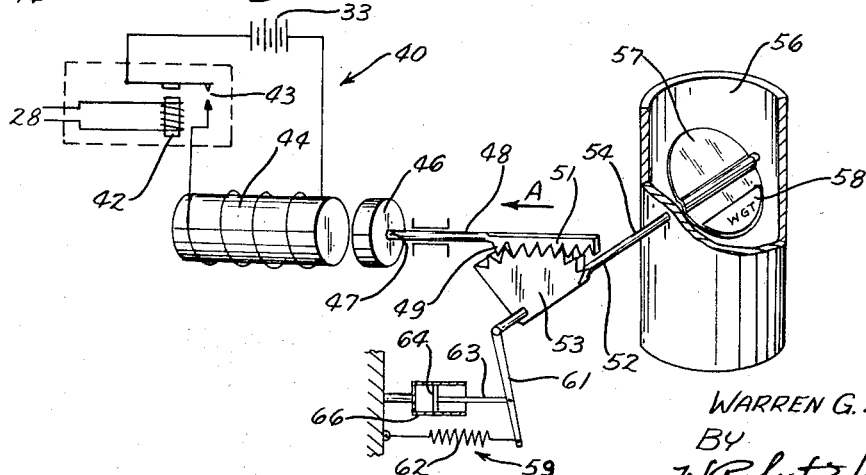
FIG. 4 is a schematic of the electric circuit and a sectional perspective view, partially in section, of the device of this invention.

Referring now to FIG. 4, the photoelectric cell unit 28 is placed in a circuit 40 as illustrated. As the vehicle crosses the stripe 22 the ray 26, emitted by the light source 23, is reflected and the unit 28 intercepts and receives the reflected ray 26a. Upon receipt of ray 26a the unit 28 emits a signal which energizes a relay 42. The energized relay closes a set of contact points 43, thus allowing an electric current, such as from the battery 33 of the vehicle, to flow in the circuit.

A solenoid 44 (FIG. 4) is electrically connected to the circuit 40 and upon energization by the flowing current in the circuit, it becomes magnetized and attracts a movable core 46. The core is secured to one end 47 of a link 48 which has a plurality of longitudinally spaced teeth 49 integrally formed thereon on the other end 51.

Perpendicularly disposed to the longitudinal axis of the link 48 (FIG. 4), and spaced therefrom, is a rotatable shaft 52. A sector gear 53 is mounted, at substantially its apex, to the shaft wherein the teeth 54 of the gear 53 mesh with the teeth 51 of the link 48. The other end 54 of the shaft is radially disposed in the throat 56 of a carburetor (not shown) of the vehicle or in the air intake passage leading to the carburetor. A butterfly valve 57 is rigidly attached to the shaft 52 and is disposed in the throat 56.

When the core 46 is attracted to the solenoid 44 the link moves in the direction as depicted by the arrow A in FIG. 4, thus causing the sector gear to rotate in a counterclockwise movement. The counterclockwise rotation of the gear 53 causes a corresponding rotation of the valve 57 from a normally vertical position to a horizontal position thus effectively blocking the throat 56 and reducing or preventing the air intake of the carburetor. A weight 58 is attached to the edge of the valve 57 to facilitate the return of the valve 57 to a vertical position when the solenoid 44 is not energized.

Each particular speed zone would be striped, with the distance between adjacent stripes 22, in a given row, spaced a given distance, dependent on the maximum speed which is allowable within the zone. For higher speed limits the stripes 22 would be spaced farther apart, while for lower speed limits the spacing would be much closer together.

In operation, as the vehicle moves into a speed zone area the light ray 26 will be reflected, and thus be received by the photoelectric cell unit 28. The reflected ray 26a will be received as a series of flashes, the frequency of which will vary according to the spacing of the stripes 22. The unit 28 will emit a series of electrical pulses corresponding to the flashes received thereby, thus the frequency of the electrical pulses is also in ratio to the spacing of the stripes 22. The electrical impulses will cause the contact 43 to close and the solenoid 44 will be energized thus pulling the core 46 thereto. The movement of the core 46 causes the butterfly valve to move and thus throttle the air intake into the carburetor. The throttling effect will decrease the power output of the vehicle engine and thus cause it to automatically reduce its speed.

When there are no stripes present the valve 57 will be in a vertical position and the operator will have full control over the velocity of the vehicle.

It is obvious that the weight 58 on the valve 57 must be of such proportion that when the speed control stripes 22 are present and the system is operating, the weight while tending to return the valve to a vertical position, will tend to do this so slowly, that between pulses of the circuit the angular rotation of the valve will be sufficiently small to prevent a hunting effect by the engine.

For closely spaced speed control stripes, at a given vehicle speed, the time between pulses of the circuit will be sufficiently small that the inertia of the mechanism will tend to prevent a rapid return or rotation of the valve 57 to the vertical position due to the weight 58.

For widely spaced speed control stripes 22, the time interval between pulses of the circuit will be sufficiently large to allow a greater rotation of the valve 57 to the vertical position due to the weight 58. Thus the control mechanism tends to have a greater throttling effect the closer the stripes 22 are placed and less effect the farther the stripes are spaced apart.

The response of the mechanism, during the time of a pulse and the time between a pulse may be improved by the addition of a spring-dashpot 59.. A linkage 61 is attached to the shaft on one end thereof and on the other end to one end of a spring 62. The other end of the spring is secured to the frame or engine of the vehicle. A piston rod 63 is pivotally connected to the linkage 61 intermediate the ends thereof. The rod 63 is secured to a piston 64 which is slidably mounted in a cylinder 66 attached to the frame or engine of the vehicle. The spring-dashpot 59 substantially modulates the action of the valve 57.

It is therefore seen that a simple, economical and effective device has been described for controlling the speed of a vehicle to that prescribed as maximum in a particular speed zone. The operator of a vehicle is not prevented in attaining slower speeds but his maximum speed is substantially reduced.

The value of the invention is enhanced in that it can be used on existing roads and highways of concrete or asphalt without modifying our present and proposed highway system in any way. It should be noted that although the specific embodiment described herein recites a road comprised of concrete 16, a like road of asphalt could also be used with all other factors remaining the same, and without affecting the functioning of the devices 10 and 11. Furthermore, although the stripes 22 are mentioned as being fluorescent paint, the paint, for example, could be of a reflective type, again without affecting the effectiveness of the devices 10 and 11.

It should also be noted that only one row of elongated stripes and only one light source 23 and one photoelectric unit 28 would effectively control the speed of the vehicle.

Although a preferred embodiment of this invention has been disclosed and described hereinbefore, it is to be remembered that various alterations and modifications may be made thereto without departing from the true spirit and scope of the invention as defined in the appended claims.

I claim:
1. A speed control device for mounting on a motorized vehicle and operable for controlling the speed of the vehicle, traveling over a road, upon entering a speed zone, wherein the surface of the road in the speed zone is provided with a plurality of longitudinally spaced, transverse- ly disposed stripes, the surface of the stripes having a texture different from that of the road, the device comprising in combination:

light source means mounted on the vehicle for directing a light ray against the road, the ray reflected at an intensity depending upon which surface it strikes;

light receiving means mounted on the vehicle for receiving said reflected ray, and operable for developing an electric pulse in response to the intensity of said reflected ray, said receiving means comprising a relay switch electrically connected thereto and operable by said electric pulse, electric power means electrically connected to said switch means, and a solenoid electrically connected to said power means, said solenoid operable to energize a speed control means;

said speed control means comprising a core operably connected to said solenoid, gear means attached to said core, and valve means mounted in the air-intake passage to the carburetor of the motor, said valve means movable from a first position wherein the passage is substantially unobstructed to a second position wherein the passage is obstructed thus reducing the air intake of the motor, said gear means operable by said core for moving said valve means from said first position to said second position;

said valve means comprising a butterfly valve weighted on one edge thereof disposed in the throat of the carburetor, said valve means automatically resettable to said first position due to said weighted butterfly valve when the light ray strikes the road subsequent to striking one or more of the stripes.

2. A speed control device as defined in claim 1, and further wherein said gear means includes a rod attached on one end thereof to said core, and the other end thereof having a plurality of teeth integrally formed thereon, a sector gear engaging said teeth, a shaft attached to said gear and projecting perpendicularly therefrom relative to the radial axis of said gear, said shaft rotatably mounted in the throat and said valve rigidly attached to said shaft.

3. A speed control device as defined in claim 2, and further wherein means is attached to said shaft for modulating the rotation thereof.

References Cited

UNITED STATES PATENTS

| | | | |
|---|---|---|---|
| 2,493,755 | 1/1950 | Ferrill | 180—82.1 |
| 2,611,352 | 9/1952 | Molyneux | 123—102 |
| 3,008,532 | 11/1961 | Reed | 180—82.1 |
| 3,017,946 | 1/1962 | Davis et al. | 180—82.1 |

FOREIGN PATENTS 495,538   8/1954   Italy.

KENNETH H. BETTS, *Primary Examiner.*